(12) United States Patent
Kelton

(10) Patent No.: US 7,085,315 B1
(45) Date of Patent: Aug. 1, 2006

(54) DIGITAL DEMODULATION UTILIZING FREQUENCY EQUALIZATION

(75) Inventor: James R Kelton, Austin, TX (US)

(73) Assignee: VIXS, Inc., Toronto (CA)

( * ) Notice: Subject to any disclaimer, the term of this patent is extended or adjusted under 35 U.S.C. 154(b) by 816 days.

(21) Appl. No.: 10/122,784

(22) Filed: Apr. 15, 2002

(51) Int. Cl.
*H03H 7/30* (2006.01)

(52) U.S. Cl. ........................ 375/219; 375/229

(58) Field of Classification Search ............. 375/229, 375/232, 233, 234, 235, 236, 260, 261, 285; 370/206, 210; 708/323
See application file for complete search history.

(56) References Cited

U.S. PATENT DOCUMENTS

| | | | | |
|---|---|---|---|---|
| 6,314,147 | B1 * | 11/2001 | Liang et al. ............. | 375/346 |
| 6,549,512 | B1 * | 4/2003 | Wu et al. ............... | 370/210 |
| 6,628,730 | B1 * | 9/2003 | Stott et al. .............. | 375/344 |
| 6,735,255 | B1 * | 5/2004 | Smart et al. ............ | 375/260 |
| 6,834,079 | B1 * | 12/2004 | Strait et al. ............. | 375/232 |

* cited by examiner

*Primary Examiner*—Khanh Tran
*Assistant Examiner*—Sam K. Ahn
(74) *Attorney, Agent, or Firm*—Garlick Harrison & Markison; Bruce E. Stuckman

(57) ABSTRACT

A method and apparatus for digital demodulation for use in a wireless communication device include processing that begins by performing a fast Fourier transform to convert a plurality of time domain symbol components representing inbound data into a plurality of frequency domain symbol components. The processing continues by frequency domain equalizing at least some of the plurality of frequency domain symbol components based on a dynamic compensation control signal to dynamically compensate for adverse transmission characteristics of the plurality of time domain symbol components. The processing then continues by generating a plurality of estimated symbols and a plurality of error values for the plurality of compensated frequency domain symbol components. The processing then continues by generating the dynamic compensation control signal based on at least one of the plurality of error values, the plurality of frequency domain symbol components and the plurality of compensated frequency domain symbol components.

22 Claims, 5 Drawing Sheets receiver 12 of radio #2

DIGITAL DEMODULATION UTILIZING FREQUENCY EQUALIZATION

TECHNICAL FIELD OF THE INVENTION

This invention relates generally to wireless communication systems and more particularly to receiving transmission within such wireless communication systems.

BACKGROUND OF THE INVENTION

Wireless communication systems are known to include a plurality of wireless communication devices that communicate directly (e.g., point-to-point) or through an infrastructure. For direct communications, a wireless communication device, such as a radio, cellular telephone, station coupled to a personal computer or laptop, et cetera, transmits data on a particular radio frequency channel directly to another wireless communication device. For infrastructure-supported communications, a wireless communication device transmits data on an assigned radio frequency channel to an access point (or a base station). The access point determines the targeted wireless communication device from the received RF signals. If the targeted wireless communication device is affiliated with the access point, the access point transmits the data to the targeted wireless communication device on a radio frequency channel. If the targeted wireless communication device is not affiliated with the access point, the access point forwards the data to a central station, which routes the data to the access point that is affiliated with the targeted wireless communication device.

To ensure reliability of data transmissions within a wireless communication system and to ensure interoperability of differing manufacturers' equipment, standards have been developed. Such wireless communications standards include IEEE8 02.11, Bluetooth, advanced mobile phone services (AMPS), digital AMPS, global system for mobile communications (GSM), code division multiple access (CDMA), local multi-point distribution services (LMDS), multi-channel, multi-point distribution systems (MMDS), and/or variations thereof.

Such standards prescribe operating parameters for particular types of wireless communication systems. For example, the IEEE 802.11a standard defines a wireless local area network that prescribes a frequency band of use, division of the frequency band into channels and subchannels, encoding/decoding convention, modulation/demodulation convention, frame format, data rates, et cetera. Further, the IEEE 802.11a standard provides various combinations of data rates and modulation schemes, which can be selected via a coding rate corresponding to a particular modulation scheme.

Within any standard compliant wireless communication system, a wireless communication device transmits and receives data via RF (radio frequency) communication paths, i.e. RF channels. To transmit data, a wireless communication device encodes and/or modulates the data in accordance with the applicable standard to produce encoded data. The wireless communication device then mixes the encoded data with a local oscillation in one or more stages to produce an RF signal. The wireless communication device transmits the RF signal via an antenna.

To receive data, a wireless communication device receives an RF signal via an antenna, filters the RF signal and amplifies it. The wireless communication device then mixes the filtered and amplified RF signal with a local oscillation in one or more stages to produce a baseband signal. In an ideal environment, the baseband signal will be identical to the encoded data produced by the wireless communication device that transmitted the RF signal. Since wireless communication devices do not operate in an ideal environment, the baseband signal produced by the receiver is not identical to the encoded data transmitted by the transmitter due to the transfer function characteristics of the RF channel and of the receiver. In particular, the baseband signal may be phase, amplitude, and/or frequency offset from the encoded signal.

To compensate for the phase, amplitude, and/or frequency offset, most receivers include frequency equalization (FEQ). One method of frequency equalization is to force frequency domain errors to zero. While this is the simplest approach, it forces some frequency components to have zero error that do not need correction, thus, in some instances, the zero forcing over compensates the baseband signal. Other methods include linear prediction and adaptive frequency equalization. Linear prediction calculates the frequency response of the RF channel to determine the appropriate response for frequency equalization. While more accurate than zero forcing, it is very complex thus expensive in cost and in integrated circuit real estate. Adaptive FEQ adjusts the frequency equalization at the data rate. For IEEE802.11a applications, adaptive frequency equalization is impractical for moderate to low cost solutions due to its complexity and speed requirements.

Therefore, a need exists for a method and apparatus that enables wireless communication devices to adequately and cost effectively compensate for the frequency transfer functions of the RF channel, the transmitter, and/or the receiver that adversely filters received signals.

DETAILED DESCRIPTION OF A PREFERRED EMBODIMENT

Generally, the present invention provides a method and apparatus for digital demodulation for use in a wireless communication device. Such a digital demodulator includes processing that begins by performing a fast Fourier transform to convert a plurality of time domain symbol components representing inbound data into a plurality of frequency domain symbol components. The processing continues by frequency domain equalizing at least some of the plurality of frequency domain symbol components based on a dynamic compensation control signal to dynamically compensate for adverse transmission characteristics of the plurality of time domain symbol components. The processing then continues by generating a plurality of estimated symbols and a plurality of error values for the plurality of compensated frequency domain symbol components. The processing then continues by generating the dynamic compensation control signal based on at least one of the plurality of error values, the plurality of frequency domain symbol components and the plurality of compensated frequency domain symbol components. With such a method and apparatus, efficient and cost effective frequency equalization may be implemented in digital demodulators, which enable more robust wireless communication devices to be economically manufactured.

Figure 1:
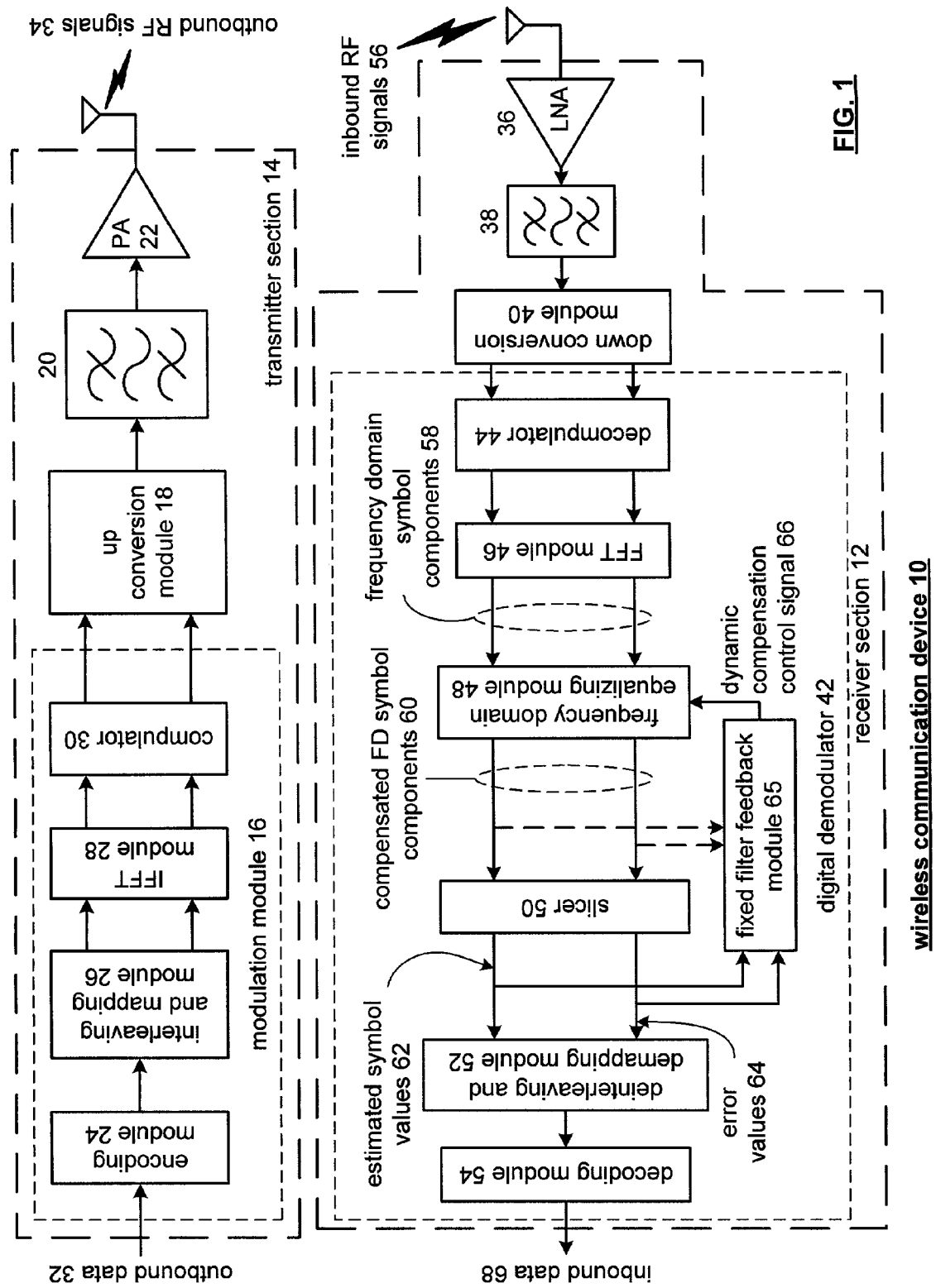
FIG. 1 illustrates a schematic block diagram of a wireless communication device in accordance with the present invention.

The present invention can be more fully described with reference to FIGS. 1–10. FIG. 1 illustrates a schematic block diagram of a wireless communication device 10 that includes a receiver section 12 and a transmitter section 14. The transmitter section 14 includes a modulation module 16, an up conversion module 18, bandpass filter 20, and a power amplifier 22 that is coupled to an antenna. The modulation module 16 may include an encoding module 24, interleaving and mapping module 26, an inverse fast Fourier transform module 28 and a compulator 30.

In operation, the transmitter section 14 receives outbound data 32 via the encoding module 24 of the modulation module 16. The outbound data 32 may be digitized voice transmissions, data transmissions, and/or any other type of information that may be communicated over a wireless communication channel. The encoding module 24 encodes the outbound data 32 in accordance with a particular wireless communication standard. For instance, for the IEEE 802.11a standard, the encoding includes scrambling, convolutional encoding, and data compression. The interleaving and mapping module 26 receives the encoded data and interleaves and maps the data to particular constellation symbols: one symbol per sub-carrier of a channel. Each of symbols includes an I and a Q component. The inverse fast Fourier transform module 28 converts the I and Q components for each of the symbols from the frequency domain to the time domain to produce a plurality of time domain magnitudes and phases, i.e., time domain symbol components.

The compulator 30 receives the plurality of time domain symbol components and converts them into a baseband analog signal that is provided to the up conversion module 18. For example, if the wireless communication device 10 is compliant with the IEEE 802.11a standard, the inverse fast Fourier transform module is converting sixty-four I and Q components, which represent sixty-four symbols, into sixty-four time domain symbol components. Of the sixty-four symbols, only fifty-two are used of which forty-eight carry data and for are pilot signals. The compulator 30 combines the sixty-four time domain symbol components (i.e., magnitudes and phases) into the baseband analog signal that is provided to the up conversion module 18.

The up conversion module 18 converts the baseband analog signal received from the compulator 30 into a radio frequency (RF) signal by mixing the baseband analog signal with one or more local oscillations in one or more stages. Bandpass filter 20 filters the radio frequency signal and provides the filtered RF signal to the power amplifier 22. The power amplifier 22 increases the energy of the RF signal such that it may be transmitted as an outbound RF signal 34 via the antenna.

The receiver section 12 includes a low noise amplifier 36, which is coupled to receive inbound RF signals 56 via an antenna, a bandpass filer 38, a down conversion module 40, and a digital demodulator 42. The digital demodulator 42 includes a decompulator 44, a fast Fourier transform module 46, a frequency domain equalizer module 48, a slicer 50, a deinterleaving and demapping module 52, a decoding module 54 and a fixed filter feedback module 65.

The low noise amplifier 36, bandpass filter 38 and down conversion module 40 are operably coupled to receive inbound RF signals 56 and produce baseband signals corresponding thereto. The decompulator 44 converts the analog baseband signals into a plurality of digital time domain symbol components (i.e., magnitudes and phases) that correspond to the plurality of time domain symbol components transmitted by a transmitting wireless communication device that transmitted the inbound RF signal 56. As previously stated, the plurality of time domain symbol components represents a plurality of symbols, which, in turn, represents encoded data.

The fast Fourier transform module 46 converts the plurality of digital time domain magnitudes and phases, i.e., time domain symbol components, into a plurality of frequency domain symbol components 58, i.e., I components and Q components. For example, in an IEEE 802.11a compliant receiver, the plurality of frequency domain symbol components includes sixty-four symbol components (e.g., sixty-four I and Q components for sixty-four symbols). Of the sixty-four symbol components, twelve represent no data, forty-eight represent data, and four represent pilot data.

The frequency domain equalizing module 48 receives the plurality of frequency domain symbol components 58 and individually compensates them for droop caused by the receiver section 12 and also compensates them for phase, frequency, and/or amplitude offsets caused by the transmission characteristics of the RF channel based on a dynamic compensation control signal 66, which includes filtering coefficients for each bin. The fixed filter feedback module 65 generates the dynamic compensation control signal 66 based on either the compensated frequency domain symbol components 60 or the estimated symbol values 62 and error values 64. While the frequency domain equalizing module 48 individually compensates each frequency domain symbol component to produce a compensated frequency domain symbol component 60, the fixed filter feedback module 65 estimates the filtering coefficients for each bin, and, for most bins, estimates the filtering coefficients based on the filtering coefficients of adjacent bins. As one of average skill in the art will appreciate, a bin contains one symbol (or symbol components) and when modulated is transmitted via one sub-carrier of a channel. The frequency domain equalizing module 48 and the fixed filter feedback module 65 will be described in greater detail with reference to FIGS. 2–5.

The slicer 50 receives the compensated frequency domain symbol components 60 and produces an estimated symbol value 62 and an error value 64 for each symbol component 60. In general, the slicer 50 maps each actual symbol 60 to the nearest valid constellation point (i.e., the estimated symbol value) and determines a difference vector between the actual symbol and the nearest constellation point (i.e., estimated error). The estimated symbol value 62 and corresponding error value 64 are more fully illustrated in FIG. 6.

Figure 6:
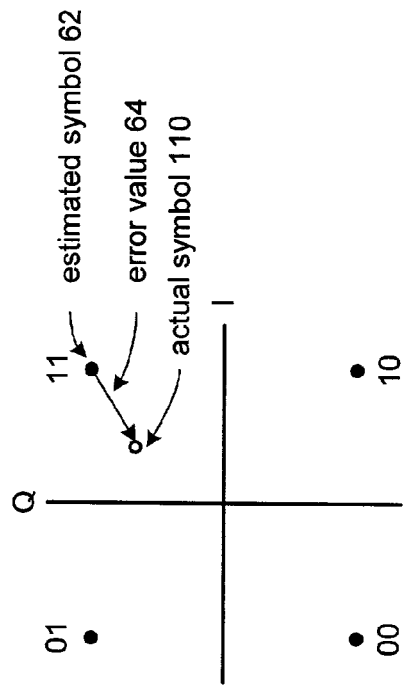
FIG. 6 illustrates a graphical representation of an estimated symbol and corresponding error value in accordance with the present invention.

FIG. 6 illustrates a graphical representation of a QPSK (quadrature phase shift keying) symbol, which is carried within a single bin, or sub-carrier, of a channel. As the symbol is processed within the receiver, the slicer 50 determines the estimated symbol value 62 and the error value 64 from the actual symbol 110 received. The error value 64 is a vector indicating the magnitude and angle of offset between the actual symbol 110 and the estimated symbol 62.

Returning to the discussion of FIG. 1, the deinterleaving and demapping module 52 receive the estimated symbol values 62 and error values 64 and deinterleaves and demaps them to recapture encoded data. The decoding module 54 decodes the encoded data to produce inbound data 68. As such, the deinterleaving and demapping module 52 and decoding module 54 are performing the inverse functions as those performed by the interleaving and mapping module 26 and the encoding module 24 of the transmitting section 14 of the radio that transmitted the inbound RF signals 56.

Figure 2:
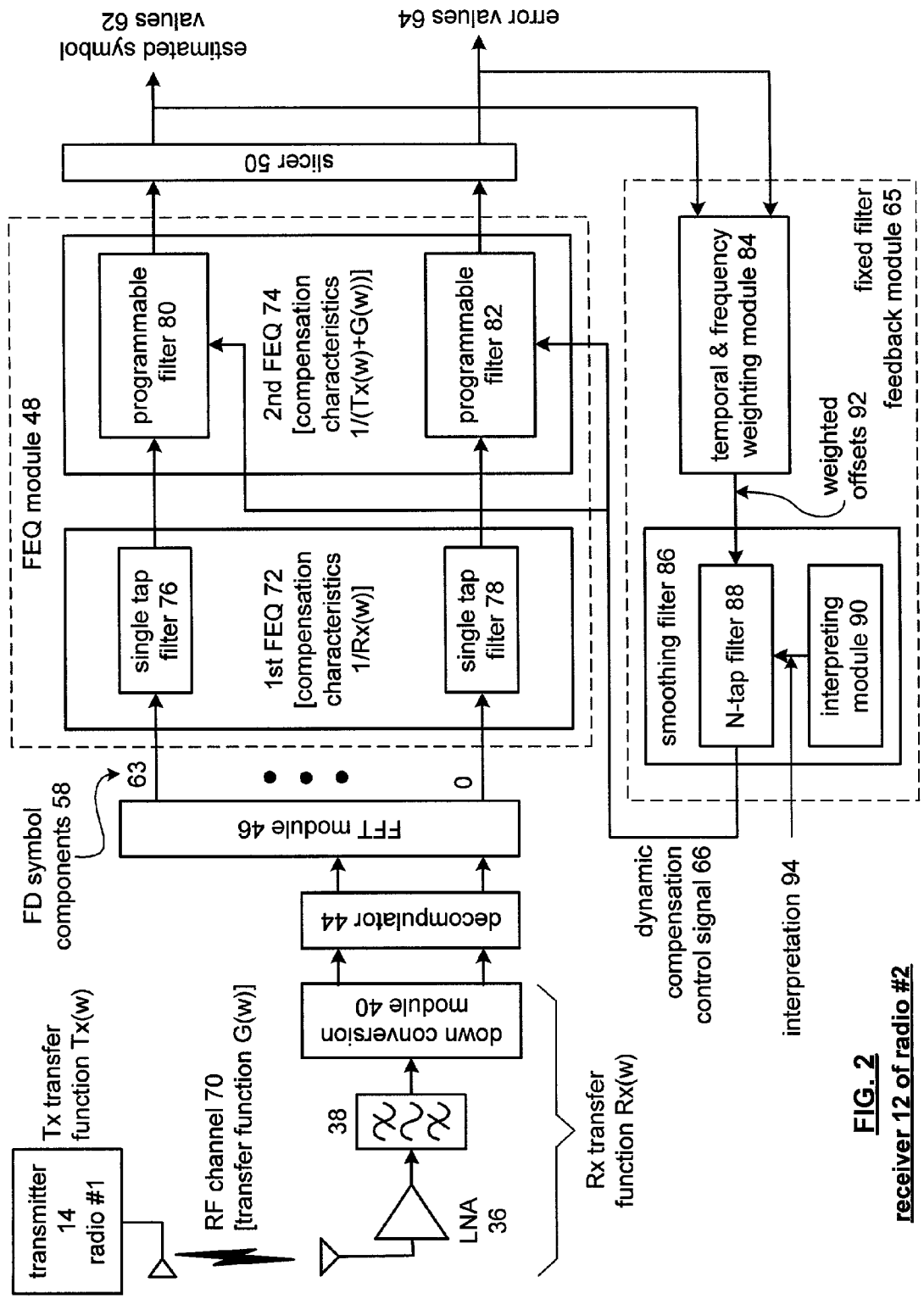
FIG. 2 illustrates a schematic block diagram of a radio receiver in accordance with the present invention.

FIG. 2 illustrates a schematic block diagram of a transmitter section 14 of a first radio (radio #1) transmitting RF signals 56 via an RF channel 70 to a receiver section 12 of a second radio (radio #2). The receiver section 12 is shown in greater detail to include the low noise amplifier 36, the bandpass filter 38, the down conversion module 40, the decompulator 44, the FFT module 46, the FEQ module 48, the slicer 50, and the fixed filter feedback module 65. The FEQ module 48 includes a $1^{st}$ FEQ 72 and a $2^{nd}$ FEQ 74, where the $1^{st}$ FEQ module 72 includes a plurality of single tap filters 76–78. The $2^{nd}$ FEQ module includes a plurality of programmable filters 80–82. The fixed filter feedback module 65 includes a temporal and frequency weighting module 84 and a smoothing filter 86. The smoothing filter 86 includes an N-tap filter 88 and an interpreting module 90.

As the transmitter section 14 of radio #1 is preparing the RF signals 56 for transmission, the transmitter section 14 is introducing phase, frequency, and/or amplitude offsets due to its transfer function $[Tx(\omega)]$. As the RF signals traverse the RF channel 70 additional phase, frequency, and/or amplitude offset is introduced due to the transfer function of the RF channel $[G(\omega)]$. As such, by the time the RF signals reach the antenna of the receiver section 12 of radio #2 a significant amount of phase, frequency, and/or amplitude offset has been introduced. Further phase, frequency, and/or amplitude offset is introduced by the low noise amplifier 36, the bandpass filter 38, and the down, which, collectively, have a transfer function $[Rx(\omega)]$.

The phase, frequency, and/or amplitude offset is propagated through the decompulator 44 and the FFT module 46 such that each of the plurality of frequency domain symbol components 58 include a phase, frequency, and/or amplitude offset. While the phase, frequency, and/or amplitude offset will vary from frequency domain symbol to frequency domain symbol, the phase, frequency, and/or amplitude offset of adjacent frequency domain symbols will be have a strong correlation. The function of the FEQ module 48 is to substantially undo the phase, frequency, and/or amplitude offset introduced by the transmitter, the RF channel, and the receiver.

To remove the phase, frequency, and/or amplitude offset introduced by the receiver, the $1^{st}$ FEQ module 72 includes a plurality of single tap filters 76–78 that collectively have a compensation characteristic of $1/Rx(\omega)$. Each single tap filter 76–78 filters a bin (i.e., a frequency domain symbol component) of a channel (e.g., an IEEE 802.11a compliant channel includes 64 bins) to filter the corresponding filtering introduced by the receiver section. The filtering performed by the $1^{st}$ FEQ module 72 can be more fully illustrated with reference to FIGS. 3–5.

Figure 3:
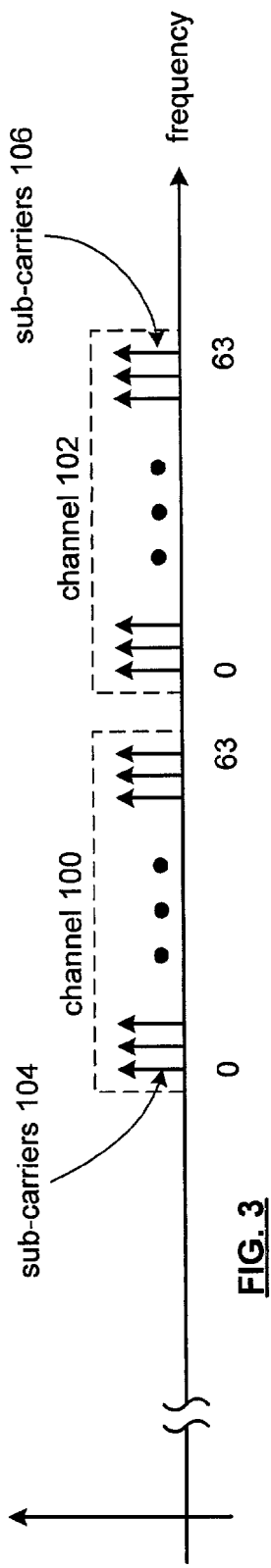
FIG. 3 illustrates a frequency response of multiple RF channels in accordance with the present invention.

FIG. 3 illustrates the frequency characteristics of a plurality of channels 100–102. Each channel includes a plurality of sub-carriers, or bins, 104 and 106. Each sub-carrier carries a symbol (i.e., a data symbol or a pilot symbol) or is used as a guard band. For instance, in an 802.11a system the channel 100 has a bandwidth of 20 MHz with each of the sixty-four sub-carriers being separated by 312.5 kilohertz. The particular symbol being supported by a sub-carrier 104 or 106 is dependent on the particular modulation scheme used. For example, for QPSK (quadrature phase shift keying), as illustrated in FIG. 6, each sub-carrier carries information that corresponds to one of four symbols. The four symbols correspond to data values of 00, 01, 10, 11.

Figure 4:
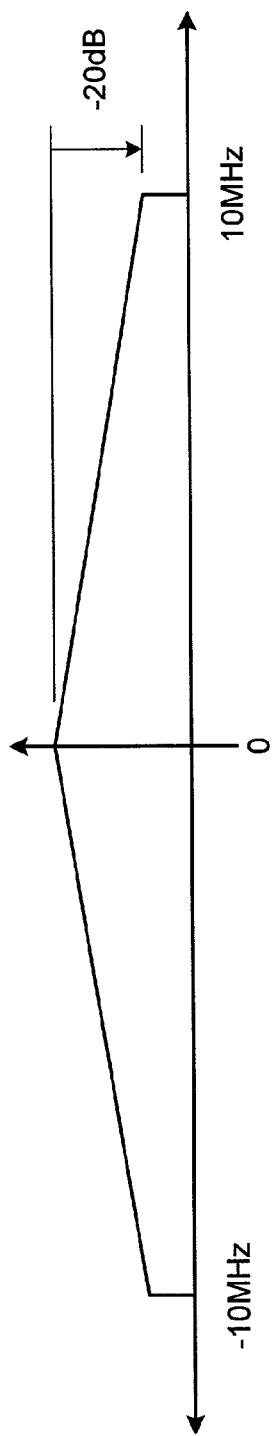
FIG. 4 illustrates a transfer function of a radio receiver in accordance with the present invention.

FIG. 4 illustrates the transfer function of the radio receiver 12. In this illustration from negative 10 MHz to zero and from zero to 10 MHz, the transfer function has a droop of approximately 20 dB. As such, when a particular channel 100 or 102 is transferred to baseband, the sub-carriers 104 or 106 at the edges of the channel are attenuated by approximately 20 dB in comparison with the sub-carriers near the center of the channel.

Figure 5:
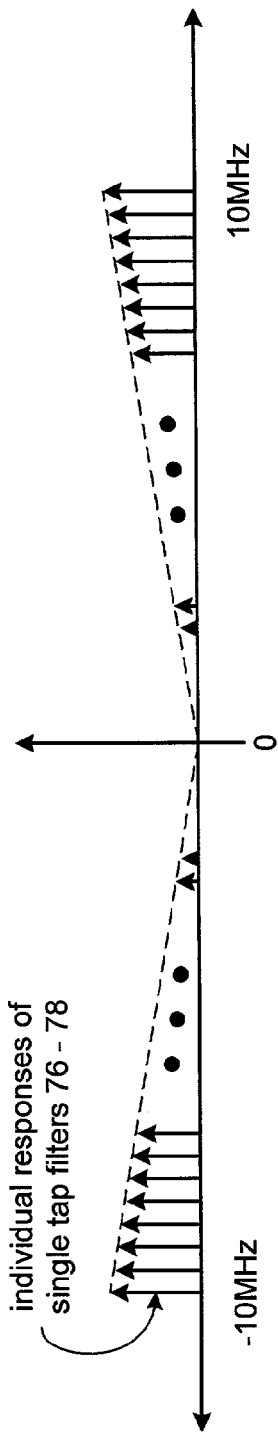
FIG. 5 illustrates the compensation characteristics of a $1^{st}$ frequency equalization module in accordance with the present invention.

FIG. 5 illustrates the transfer characteristics of the $1^{st}$ FEQ module 72, which compensate for the receiver transfer function $[Rx(\omega)]$. In this illustration, individual coefficients are established for each single tap filter 76 and 78 depending on which particular sub-carrier it is filtering. For instance, single tap filters that are filtering sub-carriers at the edge of the channels have a greater gain, or frequency response, than the single tap filters that are filtering sub-carriers near the center of the channel.

Since the receiver transfer function is fixed due to the circuitry embodying the radio receiver, the coefficients for the single tap filters of the $1^{st}$ FEQ may be readily determined and do not vary significantly over operating conditions. As such, the coefficients for the $1^{st}$ FEQ may be fixed to provide the desired frequency compensation for the droop caused by the radio receiver.

Returning to the discussion of FIG. 2, the $2^{nd}$ FEQ module 74 compensates for the transfer function of the RF channel $[G(\omega)]$ and the transfer function of the transmitter $[Tx(\omega)]$. In general, with respect to the radio receiver, the transmitter transfer function may be considered to be part of the RF channel transfer function such that the $2^{nd}$ FEQ 74 performs the function of $1/G(\omega)$, where $G(\omega)$ represents the transfer function of both the RF channel and the transmitter section. The $2^{nd}$ FEQ 74 includes a plurality of programmable filters 80–82 that are individually programmed via filtering coefficients to collectively produce the compensation characteristics of $1/G(\omega)$. Each of the programmable filters 80–82, which may be single tap filters, filters one of the frequency domain symbol components 58 received from the $1^{st}$ FEQ 72 based on its respective filtering coefficients that are contained within the dynamic compensation control signal 66. The filtering performed by the $1^{st}$ FEQ module 72 can be more fully illustrated with reference to FIGS. 7 and 8.

Figure 7:
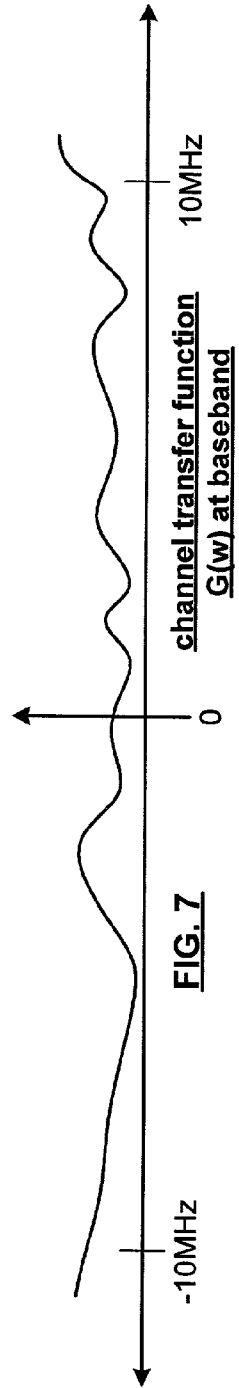
FIG. 7 illustrates a graphical representation of a transfer function of an RF channel in accordance with the present invention.

FIG. 7 illustrates an example of the transfer function of the RF channel having been down converted to baseband. As shown, the transfer function has a varying pattern and will change over time due to temperature, channel interferences, signal strength, et cetera.

Figure 8:
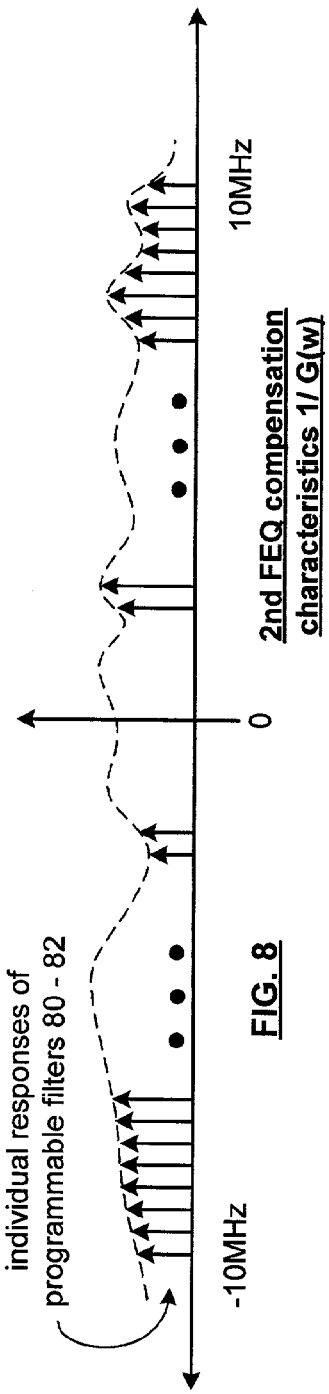
FIG. 8 illustrates a graphical representation of the compensation characteristics of a $2^{nd}$ frequency equalization module in accordance with the present invention.

FIG. 8 illustrates the frequency characteristics of the $2^{nd}$ FEQ which has a compensation characteristic of $1/G(\omega)$. In this example, each individual programmable filter 80–82 will have an individual response based on filtering coefficients contained within the dynamic compensation control signal 66.

Returning to the discussion of FIG. 2, the fixed filter feedback module 65 generates the dynamic compensation control signal 66 (i.e., the coefficients for the plurality of programmable filters 80–82 of the $2^{nd}$ FEQ 74), based on the estimated symbol values 62 and the error values 64 or based on the compensated frequency domain symbols 60. In general, the fixed filter feedback module 65 adjusts the coefficients for each of the plurality of programmable filters 82 such that the corresponding error value 64 approaches zero.

To begin, the coefficients are initialized during a training sequence during which time known signals of known phase, frequency, and amplitude are transmitted. Since the phase, frequency, and amplitude of the training signals are known, the coefficients of the programmable filters 80–82 are established to compensate for the difference in phase, frequency, and/or amplitude of the signals that were received and the known phase, frequency, and amplitude of the training signals.

Having initialized the coefficients, the fixed filter feedback module 65 dynamically updates them as needed. This is accomplished by determining weighted offsets 92 by the temporal and frequency weighting module 74 from the error values 64. In general, the temporal and frequency weighting module 74 is determining a difference between the current coefficient for one of the programmable filters 80–82 and what it should be to have an error value of zero. But, since the dominate source for error is noise once the coefficients are close to an optimum value, the correction determined by the temporal and frequency weighting module 74 is weighted, thus producing the weighted offset 92. In one embodiment, the temporal and frequency weighting module 84 may perform a least mean square function to estimate the error between the present coefficient and the present channel response and generate the weighted offset such that the coefficients are adjusted in a direction to reduce the error.

The smoothing filter 86, which includes the N-tap filter 88 and the interpreting module 90, receives the weighted offsets 92 and generates the dynamic compensation control signals 66 therefrom. As previously mentioned, the dynamic compensation signal 66 includes the coefficients for each of the programmable filters 80–82. As one of average skill in the art will appreciate, the dynamic compensation signal 66 may continually provide the coefficients for each programmable filter regardless of whether the coefficients change, or the dynamic compensation signal 66 may only provide coefficients to certain programmable filters when the coefficients change.

To produce the dynamic compensation control signal 66, i.e., coefficients for the plurality of programmable filters 80–82, the N-tap filter 88 filters the weighted offsets 82 in accordance with an interpretation 94 provided by the interpreting module 90. In general, the N-tap filter utilizes the coefficient values of adjacent bins (i.e., adjacent programmable filters that filter adjacent frequency domain symbol components) to determine the coefficients for the current bin by performing an N-tap filtering function. The interpreting module 90 monitors the adjacent bins to determine if they are empty (i.e., carrying no data). If so, the interpreting module 90 provides the interpretation 94 that causes N-tap filter 88 to alter its filtering properties for the current bin.

The N-tap filter 88 performs a filtering function of $$H_{iF} = \sum_{0}^{N} K_j H_{(ia)},$$

where $i_a=(N_j-(N-1)/2)$ and N is an odd number equal to or greater than three and Kj are selectable constants. For example, if N equals three, then the filtering function is equal to $\frac{1}{8}H_{(i-1)}+\frac{3}{4}H_i+\frac{1}{8}H_{(i+1)}$. As a further example, if N equals five, then the filtering function is equal to $\frac{1}{16}H_{(i-2)}+\frac{1}{8}H_{(i-1)}+\frac{5}{8}H_i+\frac{1}{8}H_{(i+1)}+\frac{1}{16}H_{(i+2)}$. The N-tap filter 88 performs this filtering function unless one of the adjacent bins in zero.

In the case where one of the adjacent bins is zero, the interpreting module 90 generates the interpretation 94, which causes the N-tap filter to alter the filtering function to $H_{iF}=H_i$ and $$HiF = \sum_{0}^{N} K_j H_{i(j)},$$

which performs the similar function as above, but with the bin containing zero removed from the filtering function. For example, if the second alternative is used, the filtering function may be may be $H_iF=\frac{7}{8}H_i+\frac{1}{8}H_{(i+1)}$ if the preceding sub-carrier is containing zero information or $H_iF=\frac{7}{8}H_i+\frac{1}{8}H_{(i-1)}$ if the subsequent sub-carrier is carrying zero data.

Figure 9:
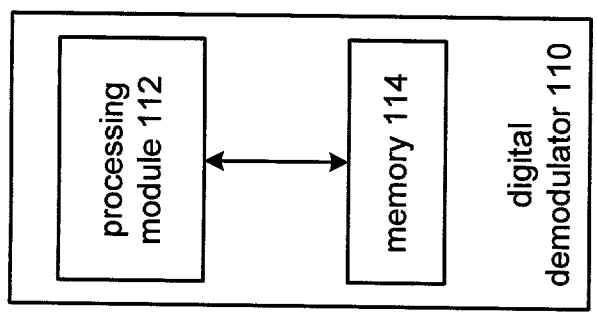
FIG. 9 illustrates a schematic block diagram of a digital demodulator in accordance with the present invention.

FIG. 9 illustrates a schematic block diagram of a digital demodulator 110 that includes a processing module 112 and memory 114. The processing module 112 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 114 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 112 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 114 stores, and the processing module 112 executes, operational instructions corresponding to at least some of the steps illustrated in FIG. 10.

Figure 10:
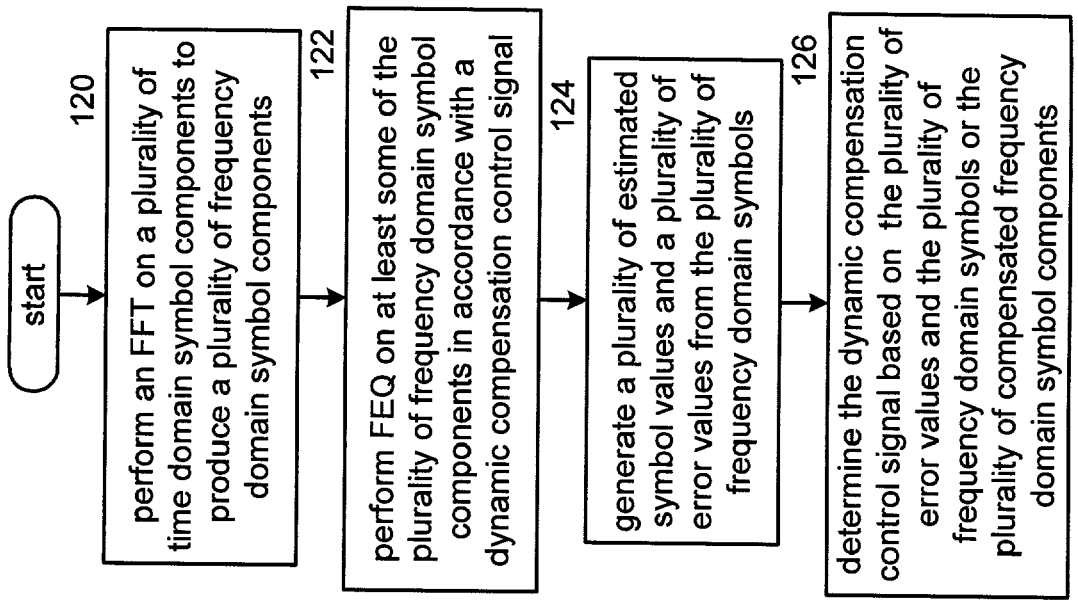
FIG. 10 illustrates a logic diagram of a method for digital demodulation in accordance with the present invention.

FIG. 10 illustrates a logic diagram of a method for digital demodulation. The process begins at Step 120 where the digital demodulator performs an FFT (fast Fourier transform) on a plurality of time domain symbol components to produce a plurality of frequency domain symbol components. The process then proceeds to Step 122 where the digital demodulator 110 performs frequency equalization on at least some of the plurality of frequency domain symbol components in accordance with a dynamic compensation control signal to produce a plurality of compensated frequency domain symbol components. The compensation is done to reduce and/or remove the adverse effects caused by the transfer characteristics of the RF channel. In addition, the frequency equalization may be done in stages, where a first stage removes the adverse effects caused by the frequency response of the receiver and a second stage removes the adverse effects caused the RF channel.

The process then proceeds to Step 124 where the digital demodulator generates a plurality of estimated symbol values and a plurality of error values from the plurality of compensated frequency domain symbol components. The process then proceeds to Step 126 where the digital demodulator determines the dynamic compensation control signal based on the plurality of error values and the plurality of frequency domain symbol components or based on the plurality of compensated frequency domain symbol components. As such, the digital demodulator is determining the coefficients for each of a plurality of programmable filters contained within the frequency equalizer, which substantially filters out the adverse effects introduced by the RF channel.

The preceding discussion has presented a method and apparatus for digital demodulation, which includes frequency equalization. As one of average skill in the art will appreciate, other embodiments may be derived from the teaching of the present invention, without deviating from the scope of the claims.

What is claimed is:

1. A wireless communication device comprises:
   transmitter section operably coupled to convert outbound data into outbound radio frequency (RF) signals;
   receiver section operably coupled to convert inbound RF signals into inbound data, wherein the receiver section includes a digital demodulator that includes:
      fast Fourier transform module operably coupled to convert a plurality of time domain symbol components representing the inbound data into a plurality of frequency domain symbol components;
      frequency-domain equalizing module operably coupled to dynamically compensate for adverse transmission characteristics of the plurality of time domain symbol components by adjusting frequency characteristics of at least some of the plurality of frequency domain symbol components in accordance with a dynamic compensation control signal to produce a plurality of compensated frequency domain symbol components, wherein the dynamic compensation control signal includes dynamic updates of coefficients for each of the at least some of the plurality of frequency domain symbol components and wherein the frequency-domain equalizing module includes first frequency domain equalizer operably coupled to compensate for adverse frequency characteristics of the plurality of time domain symbol components that are induced by the receiver section to produce a plurality of partially compensated frequency domain symbol components, and second frequency domain equalizer operably coupled to produce the plurality of compensated frequency domain symbol components by compensating the plurality of partially compensated frequency domain symbol components for adverse frequency characteristics of the plurality of time domain symbol components induced by a channel on which the plurality of time domain symbol components was received in accordance with the dynamic compensation control signal;
   slicer operably coupled to generate a plurality of estimated symbol values and a plurality of error values from the plurality of compensated frequency domain symbol components; and
   fixed filter feedback module operably coupled to determine the dynamic compensation control signal based on at least one of: the plurality of error values, the plurality of frequency domain symbol components and the plurality of compensated frequency domain symbol components.

2. The wireless communication device of claim 1, wherein the first frequency domain equalizer further comprises:
   a plurality of fixed single-tap filters operably coupled to filter the plurality of frequency domain symbol components.

3. The wireless communication device of claim 1, wherein the second frequency domain equalizer further comprises:
   a plurality of programmable filters operably coupled to filter the plurality of partially compensated frequency domain symbol components, wherein coefficients of the plurality of programmable filters are established in accordance with the dynamic compensation control signal.

4. The wireless communication device of claim 3, wherein the fixed filter feedback module further comprises:
   temporal and frequency weighting module operably coupled to determined a plurality of weighted offsets for the plurality of compensated frequency domain symbol components, wherein each of the plurality of weighted offsets indicates of at least one of time and frequency error of a corresponding one of the plurality of compensated frequency domain symbol components; and
   smoothing filter operably coupled to filter the plurality of weighted offsets to produce the dynamic compensation control signal.

5. The wireless communication device of claim 4, wherein the smoothing filter further comprises:
   N-tap filter that performs a filtering function of $$H_{iF} = \sum_{0}^{N} K_j H_{(ia)},$$

where $i_a=(N_j-(N-1)/2)$ and N is an odd number equal to or greater than three to determine the dynamic compensation control signal that establishes the coefficients for at least some of the plurality of programmable filters and where Kj are selectable constants.

6. The wireless communication device of claim 5, wherein the smoothing filter further comprises:
   interpreting module operably coupled to generate an indication when an adjacent symbol component of the plurality of frequency domain symbol components has a negligible symbol value, wherein the interpreting module provides the indication to the N-tap filter such that for a current one of the plurality of frequency domain symbol components, the N-tap filter filters the current one of the plurality of frequency domain symbol components based on at least one of: $H_{iF}=H_i$ and $$HiF = \sum_0^N K_j H_{i(j)}.$$

7. A wireless communication device comprises:
transmitter section operably coupled to convert outbound data into outbound radio frequency (RF) signals;
receiver section operably coupled to convert inbound RF signals into inbound data, wherein the receiver section includes a digital demodulator that includes:
fast Fourier transform module operably coupled to convert a plurality of time domain symbol components representing the inbound data into a plurality of frequency domain symbol components;
first frequency domain equalizer operably coupled to compensate for adverse frequency characteristics of the plurality of time domain symbol components that are induced by the receiver section to produce a plurality of partially compensated frequency domain symbol components;
second frequency domain equalizer operably coupled to produce a plurality of compensated frequency domain symbol components by compensating the plurality of partially compensated frequency domain symbol components for adverse frequency characteristics of the plurality of time domain symbol components induced by a channel on which the plurality of time domain symbol components was received in accordance with a dynamic compensation control signal;
slicer operably coupled to generate a plurality of estimated symbol values and a plurality of error values from the plurality of compensated frequency domain symbol components; and
feedback module operably coupled to generate the dynamic compensation control signal by filtering at least one of the plurality of error values, the plurality of estimated symbol values, and the plurality of compensated frequency domain symbol components.

8. The wireless communication device of claim 7, wherein the first frequency domain equalizer further comprises:
a plurality of fixed single-tap filters operably coupled to filter the plurality of frequency domain symbol components.

9. The wireless communication device of claim 7, wherein the second frequency domain equalizer further comprises:
a plurality of programmable filters operably coupled to filter the plurality of partially compensated frequency domain symbol components, wherein coefficients of the plurality of programmable filters are established in accordance with the dynamic compensation control signal.

10. The wireless communication device of claim 7, wherein the feedback module further comprises:
temporal and frequency weighting module operably coupled to determined a plurality of weighted offsets for the plurality of compensated frequency domain symbol components, wherein each of the plurality of weighted offsets indicates of at least one of time and frequency error of a corresponding one of the plurality of compensated frequency domain symbol components; and
smoothing filter operably coupled to filter the plurality of weighted offsets to produce the dynamic compensation control signal.

11. The wireless communication device of claim 10, wherein the smoothing filter further comprises:
N-tap filter that performs a filtering function of $$H_{iF} = \sum_0^N K_j H_{(ia)},$$

where $i_a = (N_j - (N-1)/2)$ and N is an odd number equal to or greater than three to determine the dynamic compensation control signal that establishes the coefficients for at least some of the plurality of programmable filters and where Kj are selectable constants.

12. The wireless communication device of claim 11, wherein the smoothing filter further comprises:
interpreting module operably coupled to generate an indication when an adjacent symbol component of the plurality of frequency domain symbol components has a negligible symbol value, wherein the interpreting module provides the indication to the N-tap filter such that for a current one of the plurality of frequency domain symbol components, the N-tap filter filters the current one of the plurality of frequency domain symbol components based on at least one of: $H_{iF} = H_i$ and $$HiF = \sum_0^N K_j H_{i(j)}.$$

13. A method of digital demodulation in a radio receiver, the method comprises:
performing a fast Fourier transform on a plurality of time domain symbol components representing the inbound data to produce a plurality of frequency domain symbol components;
performing frequency-domain equalization on at least some of the plurality of frequency domain symbol components in accordance with a dynamic compensation control signal to produce a plurality of compensated frequency domain symbol components such that adverse transmission frequency characteristics of the plurality of time domain symbol components are dynamically compensated, wherein the dynamic compensation control signal includes dynamic updates of coefficients for each of the at least some of the plurality of frequency domain symbol components and wherein the performing frequency-domain equalization includes compensating for adverse frequency characteristics of the plurality of time domain symbol components that are induced by the radio receiver to produce a plurality of partially compensated frequency domain symbol components, and producing the plurality of compensated frequency domain symbol components by compensating the plurality of partially compensated frequency domain symbol components for adverse frequency characteristics of the plurality of time domain symbol components induced by a channel on which a radio frequency signal embodying the plurality of time domain symbol components was received in accordance with the dynamic compensation control signal;

generating a plurality of estimated symbol values and a plurality of error values from the plurality of frequency domain symbol components; and determining the dynamic compensation control signal based on at least one of: the plurality of error values, the plurality of frequency domain symbol components, and the plurality of compensated frequency domain symbol components.

14. The method of claim 13, wherein the producing the plurality of compensated frequency domain symbol components further comprises:

establishing coefficients in accordance with the dynamic compensation control signal to filtering the plurality of partially compensated frequency domain symbol components.

15. The method of claim 14, wherein the determining the dynamic compensation control signal further comprises:

determining a plurality of weighted offsets for the plurality of compensated frequency domain symbol components, wherein each of the plurality of weighted offsets indicates of at least one of time and frequency error of a corresponding one of the plurality of compensated frequency domain symbol components; and smoothing the plurality of weighted offsets to produce the dynamic compensation control signal.

16. The method of claim 15, wherein the smoothing the plurality of weighted offsets further comprises:

performing a filtering function of $$H_{iF} = \sum_{0}^{N} K_j H_{(ia)},$$

where $i_a = (N_j - (N-1)/2)$ and N is an odd number equal to or greater than three to determine the dynamic compensation control signal that establishes the coefficients for at least some of the plurality of programmable filters and where Kj are selectable constants.

17. The method of claim 16, wherein the smoothing the plurality of weighted offsets further comprises:

generating an indication when an adjacent symbol component of the plurality of frequency domain symbol components has a negligible symbol value; and filtering, based on the indication, a current one of the plurality of frequency domain symbol components based on at least one of: $H_{iF} = H_i$ and $$HiF = \sum_{0}^{N} K_j H_{i(j)}.$$

18. A digital demodulation for use in a radio receiver, the digital demodulator comprises:

processing module; and memory operably coupled to the processing module, wherein the memory includes operational instructions that cause the processing module to:

performing a fast Fourier transform on a plurality of time domain symbol components representing the inbound data to produce a plurality of frequency domain symbol components;

performing frequency-domain equalization on at least some of the plurality of frequency domain symbol components in accordance with a dynamic compensation control signal to produce a plurality of compensated frequency domain symbol components such that adverse transmission frequency characteristics of the plurality of time domain symbol components are dynamically compensated by:

compensating for adverse frequency characteristics of the plurality of time domain symbol components that are induced by the radio receiver to produce a plurality of partially compensated frequency domain symbol components; and producing the plurality of compensated frequency domain symbol components by compensating the plurality of partially compensated frequency domain symbol components for adverse frequency characteristics of the plurality of time domain symbol components induced by a channel on which a radio frequency signal embodying the plurality of time domain symbol components was received in accordance with the dynamic compensation control signal;

wherein the dynamic compensation control signal includes dynamic updates of coefficients for each of the at least some of the plurality of frequency domain symbol components;

generating a plurality of estimated symbol values and a plurality of error values from the plurality of frequency domain symbol components; and determining the dynamic compensation control signal based on at least one of: the plurality of error values, the plurality of frequency domain symbol components, and the plurality of compensated frequency domain symbol components.

19. The digital demodulator of claim 18, wherein the memory further comprises operational instructions that cause the processing module to produce the plurality of compensated frequency domain symbol components by:

establishing coefficients in accordance with the dynamic compensation control signal to filtering the plurality of partially compensated frequency domain symbol components.

20. The digital demodulator of claim 19, wherein the memory further comprises operational instructions that cause the processing module to determine the dynamic compensation control signal by:

determining a plurality of weighted offsets for the plurality of compensated frequency domain symbol components, wherein each of the plurality of weighted offsets indicates of at least one of time and frequency error of a corresponding one of the plurality of compensated frequency domain symbol components; and smoothing the plurality of weighted offsets to produce the dynamic compensation control signal.

21. The digital demodulator of claim 20, wherein the memory further comprises operational instructions that cause the processing module to smooth the plurality of weighted offsets by:

performing a filtering function of $$H_{iF} = \sum_{0}^{N} K_j H_{(ia)},$$

where $i_a = (N_j - (N-1)/2)$ and N is an odd number equal to or greater than three to determine the dynamic compensation control signal that establishes the coefficients for at least some of the plurality of programmable filters and where Kj are selectable constants.

22. The digital demodulator of claim 21, wherein the memory further comprises operational instructions that cause the processing module to smooth the plurality of weighted offsets by:
generating an indication when an adjacent symbol component of the plurality of frequency domain symbol components has a negligible symbol value; and
filtering, based on the indication, a current one of the plurality of frequency domain symbol components based on at least one of: $H_{iF}=H_i$ and $$HiF = \sum_{0}^{N} K_j H_{i(j)}.$$

* * * * *